US012655297B2

(12) United States Patent
Alban et al.

(10) Patent No.: US 12,655,297 B2
(45) Date of Patent: Jun. 16, 2026

(54) METHODS FOR LIGNIN EXTRACTION

(71) Applicant: CANON VIRGINIA, INC., Newport News, VA (US)

(72) Inventors: Felicity Alban, Roswell, GA (US); Edward G. Lewis, Quinton, VA (US); Yoko Fukuda, Yorktown, VA (US)

(73) Assignee: Canon Virginia, Inc., Newport News, VA (US)

( * ) Notice: Subject to any disclaimer, the term of this patent is extended or adjusted under 35 U.S.C. 154(b) by 948 days.

(21) Appl. No.: 17/772,975

(22) PCT Filed: Oct. 30, 2020

(86) PCT No.: PCT/US2020/058277
§ 371 (c)(1),
(2) Date: Apr. 28, 2022

(87) PCT Pub. No.: WO2021/087303
PCT Pub. Date: May 6, 2021

(65) Prior Publication Data
US 2024/0158637 A1 May 16, 2024

Related U.S. Application Data

(60) Provisional application No. 62/929,622, filed on Nov. 1, 2019.

(51) Int. Cl.
C08L 97/00 (2006.01)
B82Y 35/00 (2011.01)
C07G 1/00 (2011.01)

(52) U.S. Cl.
CPC .............. C08L 97/005 (2013.01); C07G 1/00 (2013.01); B82Y 35/00 (2013.01)

(58) Field of Classification Search
CPC .......... C08L 97/005; C07G 1/00; B82Y 35/00
USPC ........................................................ 530/500
See application file for complete search history.

(56) References Cited

U.S. PATENT DOCUMENTS

| | | | |
|---|---|---|---|
| 10,072,099 B2 | 9/2018 | Smit et al. | |
| 2007/0161095 A1 | 7/2007 | Gurin | |
| 2012/0005949 A1* | 1/2012 | Stevens ................... | C10G 3/50 |
| | | | 422/208 |
| 2013/0252285 A1* | 9/2013 | Blanch .................... | C12P 19/02 |
| | | | 435/99 |
| 2016/0017444 A1 | 1/2016 | Medoff et al. | |
| 2016/0236939 A1 | 8/2016 | De Miguel Turullois et al. | |

(Continued)

FOREIGN PATENT DOCUMENTS

| | | | |
|---|---|---|---|
| CN | 107 200 851 A | | 9/2017 |
| CN | 107760739 A | * | 3/2018 |

(Continued)

OTHER PUBLICATIONS

Lou et al., CN 107200851 A machine translation in English, Sep. 26, 2017. (Year: 2017).*

(Continued)

*Primary Examiner* — David T Karst
(74) *Attorney, Agent, or Firm* — Canon U.S.A., Inc., IP Division

(57) ABSTRACT

The present disclosure relates to methods for the extraction of nano-sized lignin from lignocellulosic biomass using a deep eutectic solvent comprised of an organic salt and an organic acid.

17 Claims, 8 Drawing Sheets

(56)　　　　　　References Cited

U.S. PATENT DOCUMENTS

2017/0369802　A2 *　12/2017　Rowlands ............... C07C 29/88
2019/0062359　A1　　2/2019　Stevanovic et al.

FOREIGN PATENT DOCUMENTS

WO　　　　2015/085168　A1　　6/2015
WO　　WO-2016197233　A1 *　12/2016　　.............. C07G 1/00
WO　　　　2019/204190　A1　　10/2019

OTHER PUBLICATIONS

Ni et al., CN 107760739 A machine translation in English, Mar. 6, 2018. (Year: 2018).*
Kamireddy "Effect of Bronsted and Lewis Acids on Biochemical Conversion of Various Lignocellulosic Feedstocks into Biofuels and Chemicals" Jan. 2015, pp. 1-155.

* cited by examiner

METHODS FOR LIGNIN EXTRACTION

CROSS-REFERENCE TO RELATED APPLICATIONS

This application claims the benefit of priority to U.S. Provisional Patent Application Ser. No. 62/929,622 filed Nov. 1, 2019, which is incorporated herein by reference in its entirety. Furthermore, this application references and makes use of various techniques and features described in U.S. Patents and patent applications, each of which are also incorporated herein by reference in their entireties.

FIELD OF THE DISCLOSURE

The present invention relates to the field of resourceful utilization of waste from food and other agricultural sources including saw mills. Through use of a deep eutectic solvent, high purity, nanoscale lignin can be extracted from such waste.

BACKGROUND

Lignin is the second most abundant naturally occurring polymer, second only to cellulose, and is the only renewable source of aromatic chemistry. Lignin effectively acts as the glue that holds plants and trees upright. Lignocellulosic biomass includes hardwoods, softwoods, tree bark, herbaceous plants, husks, and nut shells with the main components of each being cellulose, hemicellulose and lignin. The lignin can be present at different percentages per plant species, ranging from about 8-40%. Its unique chemical composition makes it a one of a kind natural resource with the potential to provide many high value specialty chemicals and/or fuels. The structure of native lignin (that which is found in plants) varies depending on the type of biomass. Softwood trees, hardwood trees, grasses, nutshells, and coconut husks not only have different amounts of lignin and cellulose, the lignin also has different chemical structures in each biomass. The method of extraction also greatly effects the final structure of the recovered lignin. Currently, low quality lignin is produced as a by-product of the pulp and paper industry through a process that is generally known as the Kraft pulping process, the sulfate process or the soda pulping process For instance, Kraft lignin is obtained from Kraft pulp, using the Kraft pulp method, which is generally the method used to turn coniferous wood into pulp. This sulfur containing lignin is burned as low value fuel onsite, however, upgrading and valorizing this waste lignin is an ongoing field of research. There is also ongoing research into "biomass fractionation" or separation of sugars and lignin. Most of this "biomass fractionation" research is focused on removing lignin and retaining high purity cellulosic material that can be fermented to yield ethanol. An industrially viable process focused on producing high quality, high purity lignin would enable the production of renewable, bio-derived chemicals and fuels that, currently, are mainly derived from fossil fuels. As yet, there is not an industrially scaled method to achieve this high purity, nanoscale lignin product. Other uses for such lignin product includes as an additive or binder in advanced materials.

SUMMARY OF THE DISCLOSURE

According to one aspect of the present disclosure, there is provided an industrially viable method to extract high purity, nanoscale lignin from lignocellulosic biomass using a deep eutectic solvent. The lignocellulosic biomass can be nut shells and husks, which can further be peanut shells, walnut shells, almond shells, cashew shells, coconut husks or similar. The method of extracting nanoscale lignin comprises mechanically disrupting the lignocellulosic biomass; providing a deep eutectic solvent comprising a hydrogen bond donor and hydrogen bond acceptor; combining the mechanically disrupted biomass with the deep eutectic solvent to form a mixture; incubating the mixture; separating the mixture into solids and liquid filtrate by filtration; and precipitating nanoscale lignin from the liquid filtrate. The method additionally comprises the use of a deep eutectic solvent comprising choline chloride and formic acid, resulting in the precipitation of lignin having an average particle size of less than 550 nm.

According to another aspect of the disclosure, the hydrogen bond donor is a low molecular weight organic acid, which can be acetic acid, lactic acid, oxalic acid, formic acid, malic acid, propionic acid, maleic acid, or ascorbic acid. The hydrogen bond acceptor can be an organic salt, which can be choline chloride. It is within the scope of the present disclosure that the molar ratio of hydrogen bond acceptor and hydrogen bond donor can be between 1:1 and 1:10.

According to a further aspect, the deep eutectic solvent comprises choline chloride and formic acid. The use of formic acid in the deep eutectic solvent can provide an average particle size of less than 550 nanometers. In another aspect, such solvent can provide a yield of about 25% to about 100% of the available lignin, including about 80% of the available lignin. When considered as % by weight, such solvent can provide a yield of recovered lignin of at least 9% by weight.

In one aspect of the disclosure, the method additionally comprises decreasing the viscosity of the mixture before separating the solids and liquid filtrate, which can comprise adding an acetone and water mixture. In a further aspect, the step of incubating the mixture includes subjecting the mixture to heat, microwaves, or ultrasound.

These and other embodiments, objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

The accompanying drawings, which are incorporated herein and form part of the specification, illustrate various embodiments, objects, features, and advantages of the present disclosure.

In FIG. 4A the solvent was ChCl:lactic acid at a 1:2 molar ratio, and in FIG. 4B the solvent was ChCl:formic acid at a 1:2 molar ratio. FIG. 4B corresponds to Sample C from Table 4. In FIG. 4C, the solvent was ChCl:formic acid at a 1:6 molar ratio. FIG. 4C corresponds to Sample D from Table 4.

FIG. 5A is from Kraft Lignin B, and FIG. 5B is from Kraft Lignin A.

FIG. 6A shows Kraft lignin A, FIG. 6B shows Kraft lignin B, and FIG. 6C shows DES lignin where the DES used was ChCl:formic acid at a 1:2 molar ratio, incubated for 4 hours at 120° C. FIG. 6D shows DES lignin where the DES used was ChCl:FA at a 1:2 molar ratio, incubated for 4 hours at 90° C. FIG. 6D corresponds to Sample C from Table 4.

FIG. 7A corresponds to Sample C from Table 4, and FIG. 7B corresponds to Sample D from Table 4.

Figure 1:
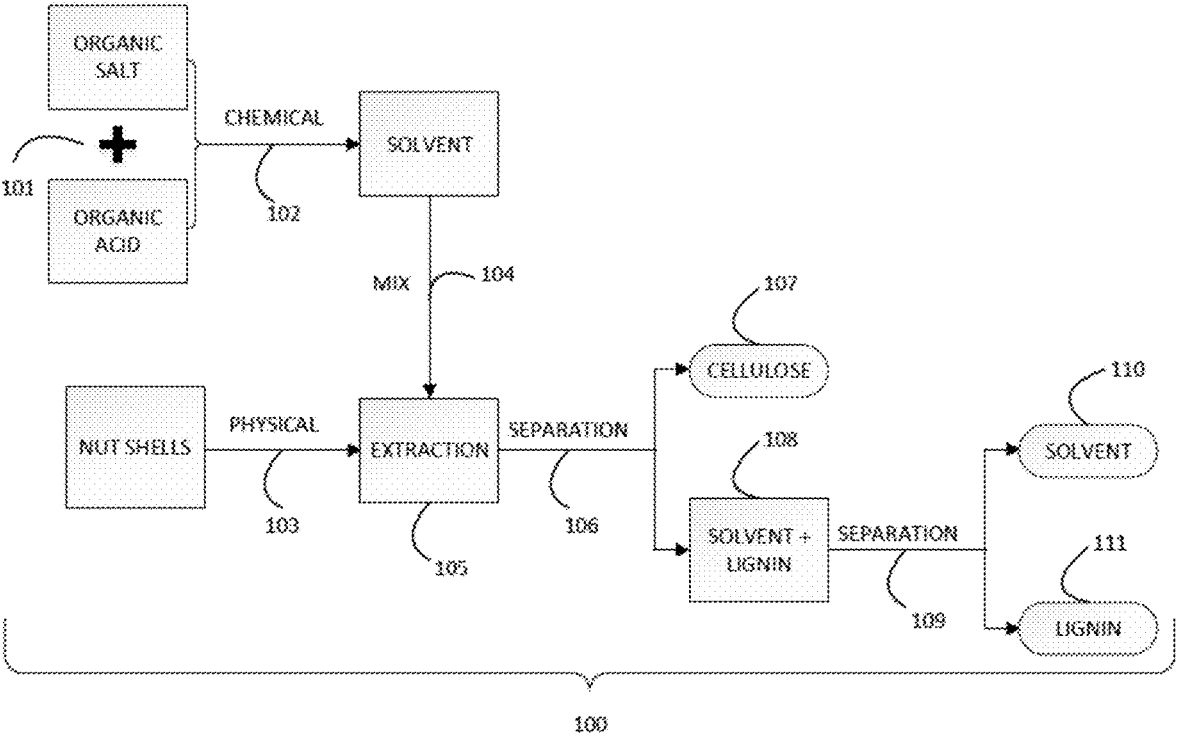
FIG. 1 is a process flow diagram showing a high-level overview of Lignin extraction from nut shells using a deep eutectic solvent.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION OF EXEMPLARY EMBODIMENT

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

Process 100 as shown in FIG. 1 depicts an overview of a process according to the current disclosure to extract lignin from lignocellulosic biomass. In step 101, an organic salt and an organic acid are mixed together, such that through chemical process 102, a solvent is prepared. A lignocellulosic biomass such as nut shells is disrupted through a physical process 103. In step 104, the disrupted biomass is mixed with the solvent, and the mixture is incubated in step 105, leading to extraction of the lignin. In step 106, separation occurs, resulting in removal of the cellulose 107 from the solvent and lignin mixture 108. In step 109, further separation occurs, resulting in removal of the solvent 110 from the lignin 111.

Figure 2:
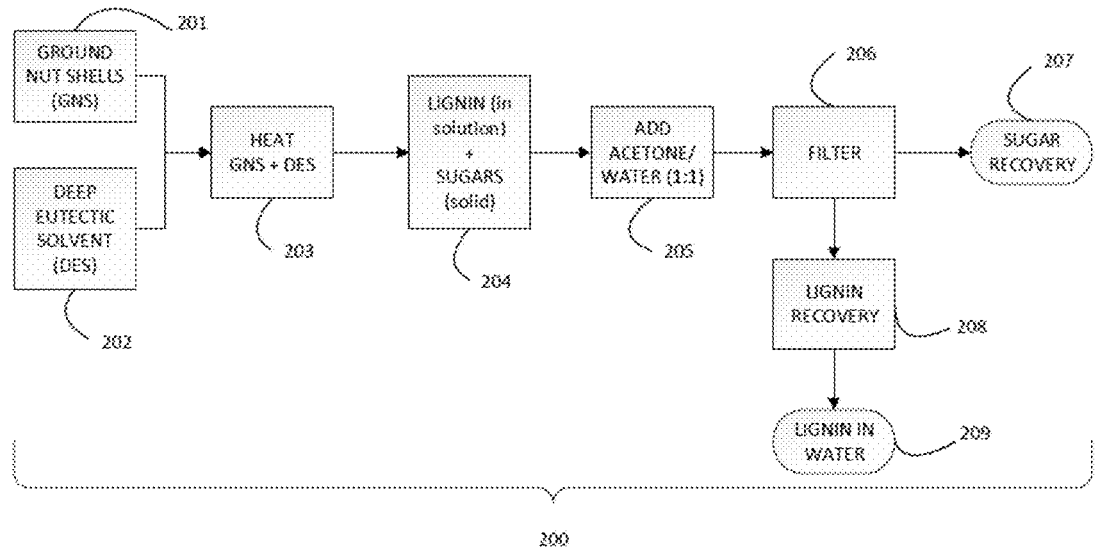
FIG. 2 is a process flow diagram depicting Lignin extraction from nut shells using a deep eutectic solved on a laboratory scale.

An exemplary process 200 according to one embodiment of the present disclosure is provided in FIG. 2. In step 201, a lignocellulosic biomass is mechanically disrupted. In one embodiment, the biomass is a nut shell. The nut shell can include, but is not limited to: shells from peanuts, walnuts, almonds, and cashews, or coconut husk, or the like. That is, the biomass in step 201 can be any nut shell or husk, and is not limited to those specifically described herein. In one embodiment, the biomass is peanut shells. In a further embodiment, the biomass is selected from food waste, agricultural waste, or agricultural by-products. Step 201 can comprise mechanical processes such as grinding, for instance using a mortar and pestle, a mill, or other similarly effective equipment, such as a coffee grinder. The result of step 201 will be referred to as ground nut shells (GNS).

In step 202, a solvent is prepared. In one embodiment, the solvent can be a deep eutectic solvent (DES). DESs are prepared from a combination of Lewis or Brønsted acids and bases that result in a mixture having multiple anionic and/or cationic species, resulting in a mixture that has a lower melting point than any of its components (Smith et al. "Deep Eutectic Solvent (DESs) and their Applications", Chem. Rev. 2014, 114, 21, 11060-11082). In one embodiment, the DES is comprised of a hydrogen bond donor and hydrogen bond acceptor. In another embodiment, the hydrogen bond donor can be an organic acid. Further, the organic acid can be a low molecular weight organic acid. In a further embodiment, the hydrogen bond acceptor can be an organic salt. Thus, the DES can comprise an organic salt with an organic acid. In one exemplary embodiment, the hydrogen bond acceptor and the organic salt can be choline chloride. In another exemplary embodiment, the hydrogen bond donor and the organic acid can include, but is not limited to, acetic acid, lactic acid, oxalic acid, formic acid, malic acid, propionic acid, maleic acid, or ascorbic acid. In one embodiment, the organic acid is formic acid.

The DES prepared in step 202 can be prepared using a range of molar ratios between the hydrogen bond acceptor and the hydrogen bond donor or between the organic salt and the organic acid. For instance, the organic salt:organic acid molar ratio can be from about 1:1 to about 1:10. In one embodiment, the molar ratio can be 1:1, 1:2, 1:3, 1:4, 1:5, 1:6, 1:7, 1:8, 1:9, 1:10, or any ratio in between. In another embodiment, the organic salt:organic acid molar ratio is 1:2 or 1:6.

In one embodiment of the present disclosure, the DES is comprised of choline chloride and formic acid, in a molar ratio of from 1:1 to 1:10. In another embodiment, the DES is comprised of choline chloride and formic acid, in a molar ratio of from 1:2 or 1:6.

It is within the scope of the present disclosure that the chemistry of the DES allows the user to isolate only the desired compounds from process 200, such that the result yields a highly purified lignin. Fox example, in one embodiment, the process 200 separates cellulose and/or hemicellulose from lignin.

In step 203, the GNS and DES are mixed and incubated. Mixing and incubating step 203 can involve applying heat, microwaves, and/or ultrasound to the mixture. In one embodiment, the application of heat can involve introducing the mixture into a water or oil bath, using a heat plate or other external heating method, or similar as would be known to those of skill in the art. In one embodiment, the mixture may be heated to 150° C., for instance, to 30° C., 40° C., 50° C., 60° C., 70° C., 80° C., 90° C., 100° C., 110° C., 120° C., 130° C., 140° C., 150° C., or any temperature between. Heating of the mixture may occur for any amount of time required for the extraction to occur, including 0-6 hours, such as 1 hour, 2 hours, 3 hours, 4 hours, 5 hours, 6 hours, and any interval of time between. Applying microwaves to the mixture can include placing the mixture in a commercial microwave for a period of time not to exceed 10 minutes, such as 30 seconds, 1 minutes, 2 minutes, 3 minutes, 4 minutes, 5 minutes, 6 minutes, 7 minutes, 8 minutes, 9 minutes or 10 minutes. Ultrasound may be applied to the mixture in those amounts and setting as would be understood by those of skill in the art.

Incubation step 203 leads to the extraction of lignin (in solution) and sugars (solids) from the mixture as seen in step 204. In step 205, the viscosity of the mixture can be reduced by adding a viscosity reducer. In one embodiment, the viscosity reducer can be a mixture of acetone and water. In a further embodiment, the viscosity reducer can be in a 1:1 ratio or acetone and water. Those of skill in the art will recognize those viscosity reducers and amounts which can be useful in the present disclosure.

In step 206, the mixture is separated into solids and liquid filtrate by filtration. Filtration can be accomplished by any means known in the art. In one embodiment, a non-cellulosic filter can be used in to avoid contamination of the recovered lignin with cellulose.

In step 207, the solids are recovered. The solids comprise the remaining sugars following the lignin extraction, and can be washed and stored for additional uses as desired.

In step 208, the lignin is recovered. Lignin recovery can include precipitating the lignin from the liquid filtrate, for example, by the steps of allowing the acetone to evaporate, and adding a material to cause the lignin to precipitate from solution. In one embodiment, deionized water (DI water) can be added to the liquid filtrate to cause the lignin to precipitate. In a further embodiment, techniques known to those of skill in the art, such as stirring or centrifugation can be applied to the liquid filtrate in order to ensure the maximum amount of lignin is recovered.

In step 209, the liquid filtrate can be removed, for instance by decanting and the precipitated lignin can then be washed. For instance, DI water can be used for one or more washes to increase the purity of the lignin. The recovered lignin can then be dried and stored as desired.

According to the present disclosure, the recovered lignin is of nanoscale. That is, the recovered lignin has an average particle size, as determined by those methods known to those of skill in the art, of under 900 nm. The average particle size can be about or less than 50 nm, about or less than 75 nm, about or less than 100 nm, about or less than 125 nm, about or less than 150 nm, about or less than 175 nm, about or less than 200 nm, about or less than 225 nm, about or less than 250 nm, about or less than 275 nm, about or less than 300 nm, about or less than 325 nm, about or less than 350 nm, about or less than 375 nm, about or less than 400 nm, about or less than 425 nm, about or less than 450 nm, about or less than 475 nm, about or less than 500 nm, about or less than 525 nm, about or less than 550 nm, about or less than 575 nm, about or less than 600 nm, about or less than 625 nm, about or less than 650 nm, about or less than 675 nm, about or less than 700 nm, about or less than 725 nm, about or less than 750 nm, about or less than 775 nm, about or less than 800 nm, about or less than 825 nm, about or less than 850 nm, about or less than 875 nm, or about or less than 900 nm, or any amount between. In one embodiment, the average particle size is about or less than 825 nm, about or less than 575 nm, or about or less than 550 nm. In a further embodiment, when a formic acid based DES is used, the average particle size can be about 550 nm.

Although the exact chemical reaction leading to the lignin extraction in DES is an as yet unknown mechanism, those of skill in the art will understand and recognize possible mechanism in view of the present disclosure. In one embodiment, the DES of the present disclosure is composed of choline chloride and an organic acid. The choline chloride is soluble in water and the organic acid is miscible in water. The lignin is not soluble in water. With the addition of water, the hydrogen bonds holding the choline chloride and the organic acid together are replaced by hydrogen bonds with the water molecules (the DES essentially dissolves into the water). This can create a situation where the lignin is supersaturated in the DES and at some point the lignin is forced out of solution in the form of a precipitate. The rate at which water or other precipitate causing liquid is added to the lignin/DES solution (the liquid filtrate), the temperature of the water and the lignin/DES solution, and the particular chemistry of the hydrogen bond donor can impact the size and shape of the nanoparticles. In one facet of the present disclosure, the user can manipulate the size and shape of the nanoparticles by altering the rate at which a liquid (e.g. water) is introduced to cause precipitation, the temperature of that liquid, as well as its composition, each of which can be optimized by routine experimentation given the disclosure provided herein.

The process of the present disclosure provides a highly efficient means of extracting lignin from the starting biomass. When considering the upper limit of the percentage by weight of lignin extracted from the starting biomass, the constraint must be the overall percent by weight of lignin found in the starting biomass. As this amount varies by type of biomass, any comparison of percent yield by weight must be normalized for the starting amount of lignin. Thus, as described herein, the present disclosure can result in final yields of recovered lignin (Table 3) from 8% by weight to 42% by weight. Thus, it is a facet of this disclosure that the described process can provide percent yields by weight of about 8%, 9%, 10%, 12%, 15%, 20%, 25%, 30%, 35%, 40%, 45%, 50%, 55%, 60%, 65%, 70%, 75%, 80%, 85%, 90%, 95% or 100%. The percent by weight recovered can be calculated as:

$$\% \text{ weight} = \left( \frac{\text{weight of lignin recovered}}{\text{weight of starting biomass}} \right) * 100$$

The percent by weight recovered can alternately be described as recovery of about 22% to 100% of the available lignin. The average of the final yields of recovered lignin (Table 3) ranged from 12% to 28% by weight, corresponding to recovery of about 34% to 80% of the available lignin when calculated as:

$$\% \text{ available lignin recovered} =$$
$$\left( \frac{\text{weight of lignin recovered}}{\text{weight of lignin present in starting biomass}} \right) * 100.$$

In one embodiment, the present disclosure therefore provides a means for the recovery of about from about at least 25%, 30%, 35%, 40%, 45%, 50%, 55%, 60%, 65%, 70%, 75%, 80%, 85%, 90%, 95% or 100% of the available lignin. In a further embodiment, a DES containing formic acid used in the process of the present disclosure can provide recovery of about 9% to 100% of lignin by weight (Table 3), including about 9%, 10%, 12%, 15%, 20%, 25%, 30%, 35%, 40%, 45%, 50%, 55%, 60%, 65%, 70%, 75%, 80%, 85%, 90%, 95% or 100%. Alternatively or in addition, a DES containing formic acid used in the process of the present disclosure can provide recovery of about or about 25 to 100% of the available lignin, including about 25%, 30%, 35%, 40%, 45%, 50%, 55%, 60%, 65%, 70%, 75%, 80%, 85%, 90%, 95% or 100%.

In one embodiment of the present disclosure, the efficiency of the lignin extraction can be optimized by selecting a higher molar ratio for the DES composition using a lower molecular weight organic acid. In a further embodiment, an organic salt:organic acid molar ratio of 1:5, 1:6, 1:7, 1:8, 1:9 or 1:10 can be used.

In one non-limiting embodiment, process 200 can include a deep eutectic solvent (DES) composed of choline chloride and formic acid that is heated in a reaction vessel with finely ground nut shells. The DES selectively extracts lignin into solution while leaving the sugars in the solid phase. A small amount of acetone/water (1:1) can be added to the reaction mixture if desired to decrease the viscosity before filtration. The solids can be separated from the filtrate, and deionized (DI) water can be added to the filtrate at a volume of approximately two (2) to five (5) times the total volume of filtrate causing lignin to precipitate out of solution. The liquid can be decanted off and more water added as a wash step until the lignin is "clean". The washed and precipitated lignin can be dried and used for downstream applications including chemical modifications, wherein the average particle size of the precipitate lignin is in the size range of nanometers, and is more specifically less than 900 nm.

Those of skill in the art will readily understand the manner in which the present disclosure can be scalable and viable on an industrial scale.

EXAMPLES

General Procedure

The examples provided herein utilize the following basic procedure except where alternate conditions are provided below.

Peanut Shell Preparation

Peanut shells were dried in an oven at 60° C. overnight. Following drying, the shells were ground using a countertop coffee grinder for approximately 1 minute. Ground peanut shells were stored in the presence of a commercial desiccant.

Solvent Preparation: Organic Salt:Organic Acid

For solvent preparation, choline chloride was utilized as the organic salt. Various organic acids were utilized as shown in Table 2.

Choline chloride was dried in the oven at 45° C. overnight. Upon removal of the the oven the choline chloride was immediately moved to the dessicator. The organic acid was weighed out, and combined with the choline chloride in a beaker to provide a molar ratio of ChCl:organic acid of 1:2 or 1:6, designated as low or high, respectively in Table 2. The organic acid and choline chloride were heated on a hot plate at 60° C. while being continuously stirred at 200 rpm. Once a clear liquid was formed, the solvent was stored in an airtight vial and allow to cool in the desiccator.

Biomass (Pre) Treatment and Lignin Recovery: Hot Bath

~1.5 grams of ground peanut shells were weighed and placed in a reaction vessel with ~15 grams of DES. A hot water or oil bath was prepared, and the reaction vessel was partially submerged in the bath for ~1 hour. The reaction vessel was removed from the bath and allowed to cool to room temperature.

Once the mixture cooled, ~15 mL of an acetone:water mixture (50/50) was added. The mixture was then filtered through a non-cellulose based filter in order to prevent contamination. The solids were collected from the filter and the filtrate saved. The collected solids were washed twice (2×) with an acetone:water mixture (50/50), and the filtrate was saved.

The washed solids (sugars) were stored in the −20° C. freezer and all filtrates were combined. The acetone was evaporated from the filtrate, and DI water was added to precipitate the lignin. The filtrate was centrifuged at 10,000×g for five (5) minutes to complete the recovery of all lignin. The lignin was washed three (3) times with DI water before being dried in the oven at 45° C., or lyophilized according to standard procedures.

Biomass (Pre) Treatment and Lignin Recovery: Microwave Assisted

~2.5 grams of ground peanut shells were weighed and placed in a reaction vessel with ~25 grams of DES. The reaction vessel was placed into a microwave for 45 seconds at 800 W. The reaction vessel was removed and allowed to cool to room temperature.

Once the mixture cooled, ~30 mL of an acetone:water mixture (50/50) was added.

The mixture was then filtered through a non-cellulose based filter in order to prevent contamination. The solids were collected from the filter and the filtrate saved. The collected solids were washed four (4) times with 20 mL an acetone:water mixture (50/50), and the filtrate was saved.

The washed solids (sugars) were stored in the −20° C. freezer and all filtrates were combined. The acetone was evaporated from the filtrate, and DI water was added to precipitate the lignin. The filtrate was centrifuged at 10,000×g for five (5) minutes to complete the recovery of all lignin. The lignin was washed with 15 mL of EtOH:H₂O (1:9) five times before being dried at 45° C. for ~12 hours before being stored in an airtight container.

DES Screening

In order to determine efficiency of various DESs and other conditions, the above general procedure was performed using four organic acids (Citric Acid, Acetic Acid, Formic Acid and Lactic Acid) used to prepare a DES having a low or high molar ratio (1:2 or 1:6) and reaction temperatures used were either 90° C. or 120° C.

In order to compare the results, it was assumed that mass loss due to container transfer was negligible and that 100% of the mass loss was due to lignin extraction.

Ranking of the DESs and conditions relied on the following criteria.

TABLE 1

| Ranking Criteria. | |
|---|---|
| Criteria | Considerations |
| Effectiveness (i.e. yield) | Ranked from 1-32 with 32 being the worst. "Yield" was based on the percentage of ground peanut shells dissolved. |
| Toxicity | Numerical score based on NFPA Diamond. 12 is most toxic. 0 is least toxic. |
| Energy Intensity | Ranked based on experimental conditions (4-1 with lower # being less energy intensive) using the following: 3 hours at 120° C. >3 hours at 90° C. >1 hour at 120° C. >1 hour at 90° C. |
| Ease of extraction | Ranked from 1-4, with 1 being the least complicated extraction. |

This ranking provided a worst score possible score of 52/52 (32 for effectiveness/yield, 12 for toxicity, 4 for energy intensity, and 4 for ease of extraction). The best possible score was 3/52.

A one-way ANOVA analysis performed individually on each factor revealed that the acid type was the only statistically significant factor. The results of the top ten solvent/extraction condition combinations is shown in Table 2.

TABLE 2

| | | | | Top 10 Results | | |
| ACID TYPE | Rxn Time | Rxn Temp. | Molar Ratio | % of PS that dissolved | SCORE | Normalized score |
| --- | --- | --- | --- | --- | --- | --- |
| Citric Acid | 2 | 120 | Low | 43.49% | 9 | 17% |
| Acetic Acid | 2 | 90 | High | 42.47% | 10 | 19% |
| Formic Acid | 4 | 120 | High | 45.44% | 11 | 21% |
| Formic Acid | 4 | 90 | Low | 41.17% | 13 | 25% |
| Formic Acid | 2 | 120 | High | 29.87% | 13 | 25% |
| Formic Acid | 2 | 120 | Low | 24.70% | 16 | 31% |
| Formic Acid | 4 | 120 | Low | 26.17% | 16 | 31% |
| Lactic Acid | 2 | 120 | High | 23.32% | 17 | 33% |
| Acetic Acid | 4 | 120 | High | 25.57% | 17 | 33% |
| Formic Acid | 4 | 90 | High | 23.71% | 18 | 35% |

Results

Figure 3:
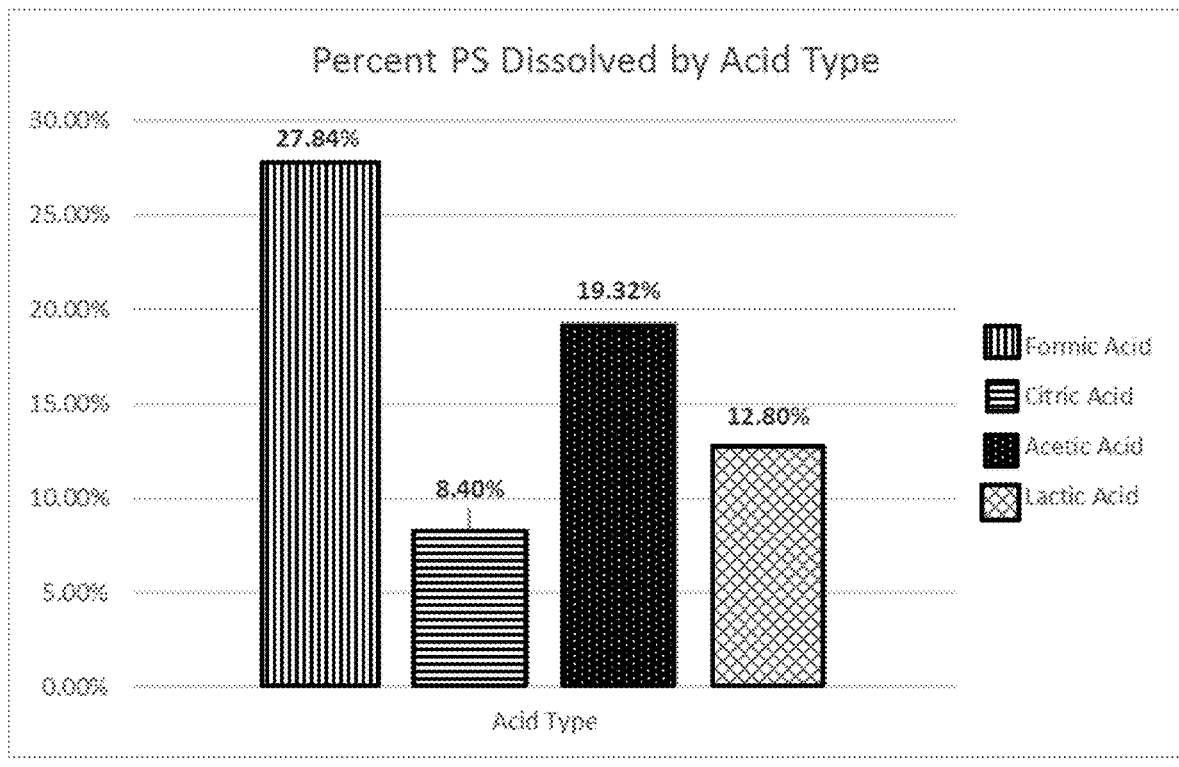
FIG. 3 is a bar graph comparing the percent of lignin extracted by various deep eutectic solvents.

FIG. 3 illustrates the average percent of biomass (peanut shells) that were dissolved by the four selected compositions of deep eutectic solvents (DES). Of the four DES s tested, the DES of choline chloride and formic acid dissolved significantly more biomass (27.84%), on average, than the other combinations (p=0.03). The organosolv conditions tested (based on the organosolv process as understood in the state of the art), on average, dissolved 13.02% of the ground peanut shells. The initial weight of peanut shells varied throughout the experiments and as such, the final results were normalized. The mass lost was assumed to be composed solely of lignin, which conclusion was supported by the FT-IR analysis, illustrated in FIGS. 4A-C and 5A-B. The peaks correspond to know references.

Figure 7A:
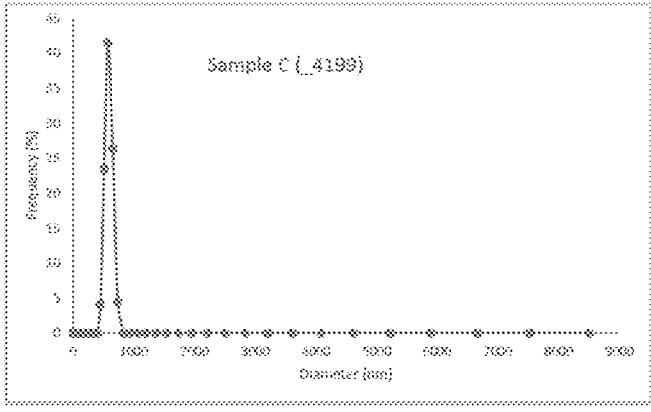
FIG. 7A-B are particle size distribution graphs for two samples extracted with a formic acid based DES.
Figure 7B:
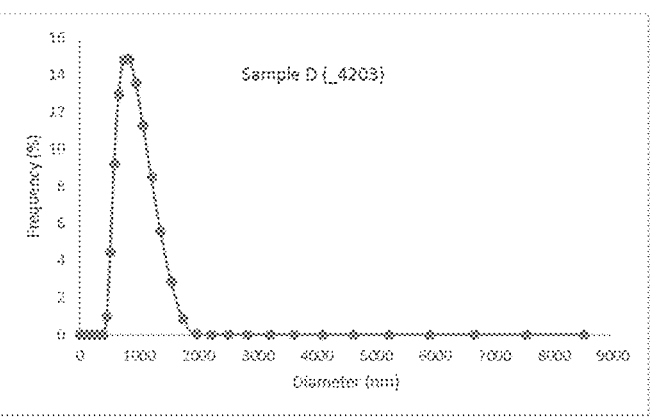

Particle Size Distribution Graphs of are provided in FIG. 7A-B, wherein the X-axis represents the diameter of the particles, the Y-axis represents the "frequency with which that size was observed". All graphs were produced using data obtained from tests using the same solvent. The average particle size for FIG. 7A was ~550 nm, while for FIG. 7B, the average particle was ~820 nm. Exemplary SEM images are shown in FIG. 6A-D.

Overall, results demonstrated that a higher incubation temperature (120° C.) provided more efficient extraction than the lower incubation temperature (90° C.). DES made of formic acid was more efficient than other hydrogen bond donors/organic acids. DES made of formic acid yielded significantly more lignin from the ground peanut shells during the extraction process. Peanut shells comprise approximately 35% lignin by weight. Use of DES made of formic acid provided an average recovery of 27.84% lignin by weight, thereby providing on average extraction and recovery of over 75% of the available lignin.

TABLE 3

| | Recovery of lignin. | | |
| Hydrogen Bond Donor | Minimum | Average | Maximum |
| --- | --- | --- | --- |
| Formic Acid | 9 wt % | 27.84% | 45 wt % (some hemicellulose was extracted with the lignin) |

TABLE 3-continued

| | Recovery of lignin. | | |
| Hydrogen Bond Donor | Minimum | Average | Maximum |
| --- | --- | --- | --- |
| Acetic Acid | 8 wt % | 19.32% | 42 wt % (some hemicellulose was extracted with the lignin) |
| Lactic Acid | 8 wt % | 12.80% | 23 wt % |

CONCLUSIONS

Based on the results of the DES screening, it was found that the type of acid employed in the creation of the deep eutectic solvent has a statistically significant effect on the percentage of peanut shell dissolved (p=0.029) with formic acid being the most effective.

The temperature, reaction time, and molar ratio showed an effect on the percentage of peanut shell dissolved, however these results were not statistically significant.

Figure 4A:
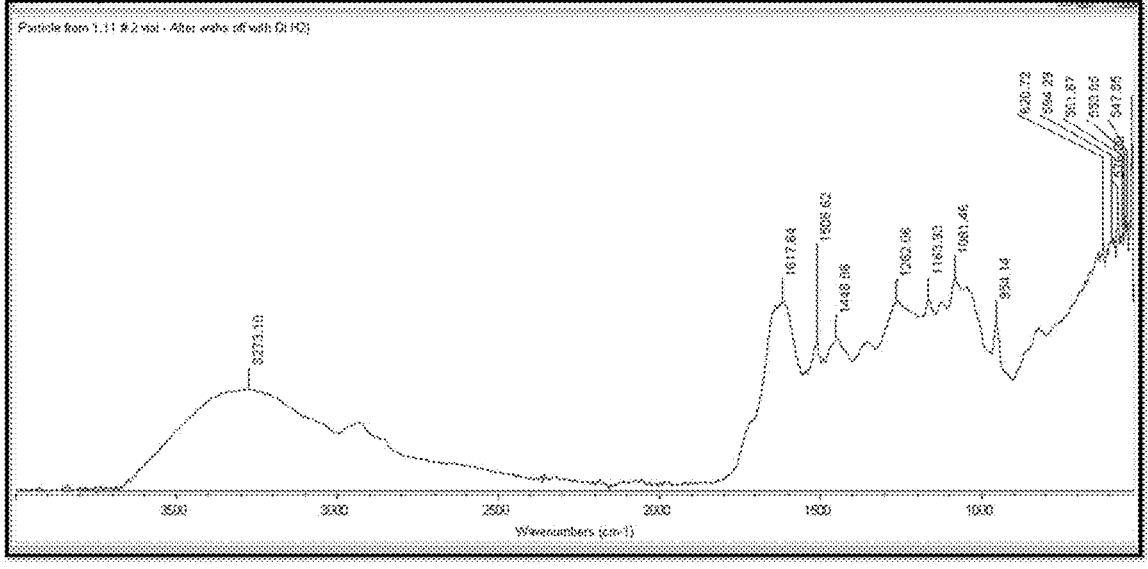
FIG. 4A-C are FT-IR spectra of lignin extracted from peanut shells using a deep eutectic solvent.
Figure 4B:
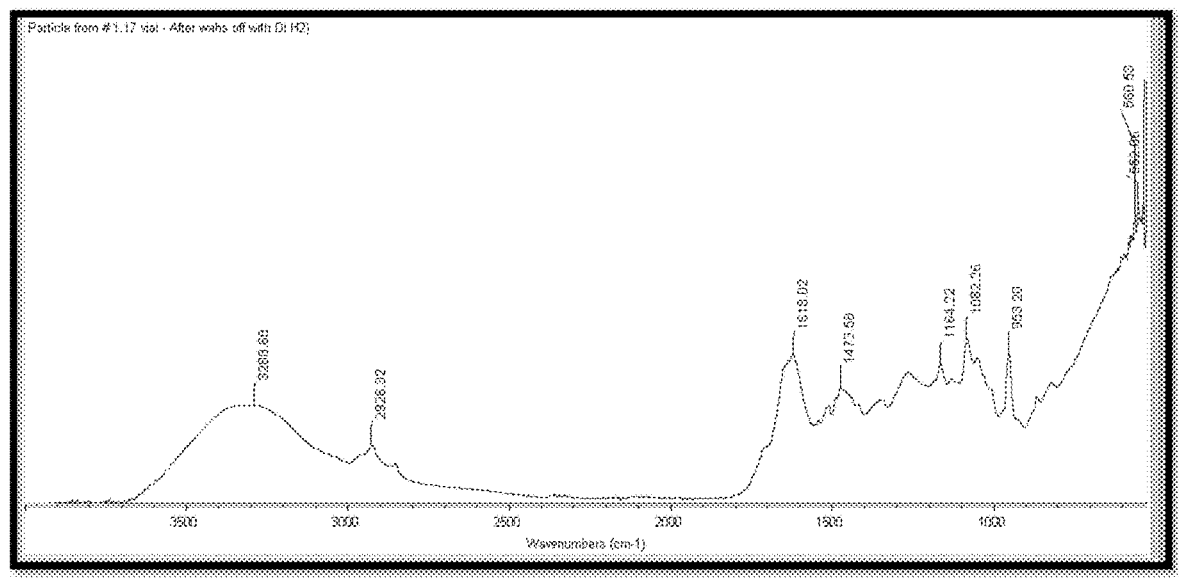
Figure 4C:
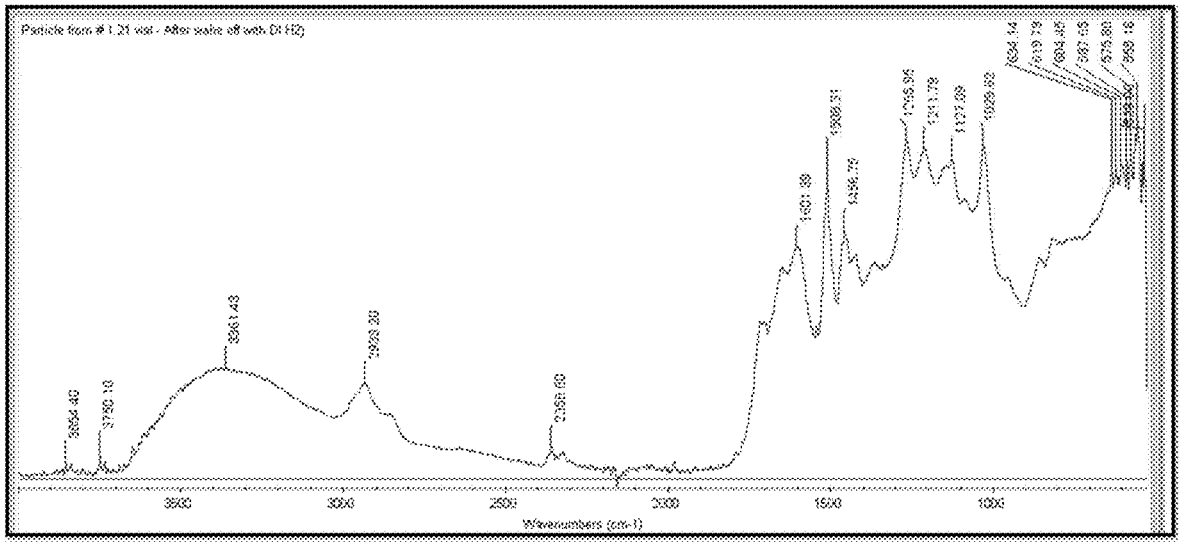
Figure 5A:
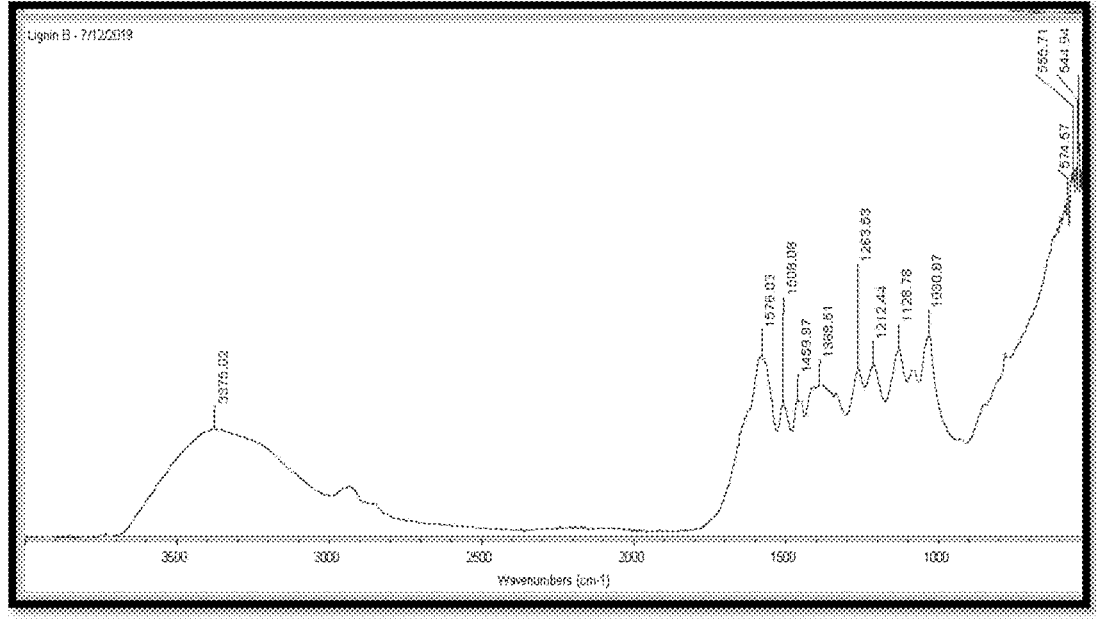
FIG. 5A-B are FT-IR spectra of two types of Kraft lignin.
Figure 5B:
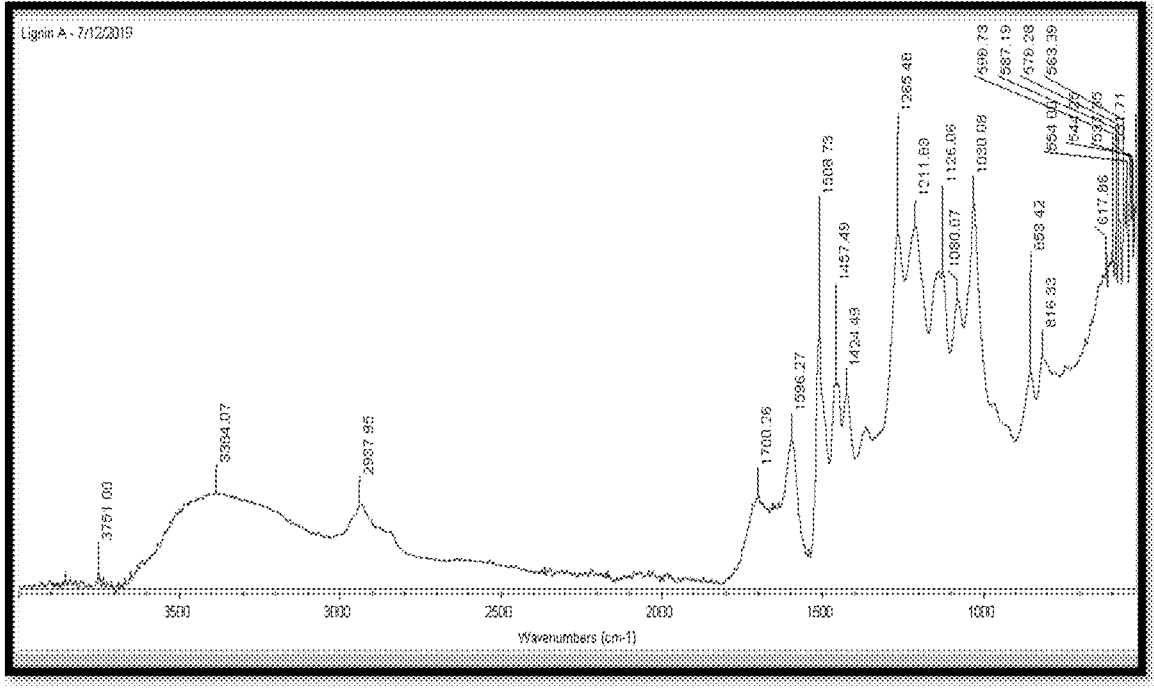
Figure 6A:
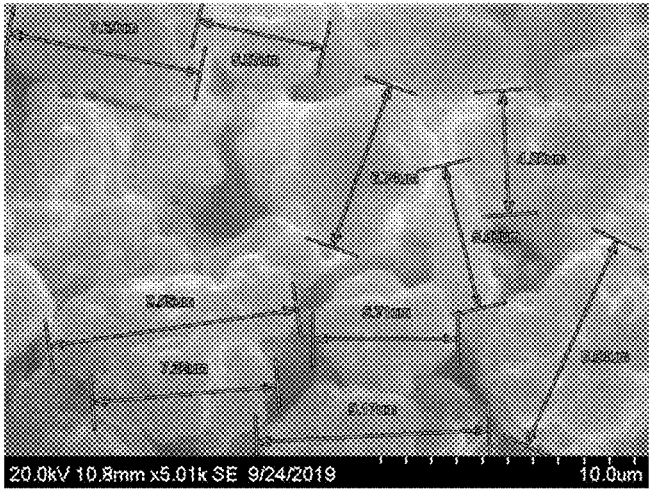
FIG. 6A-D are scanning electron microscope (SEM) Images.
Figure 6B:
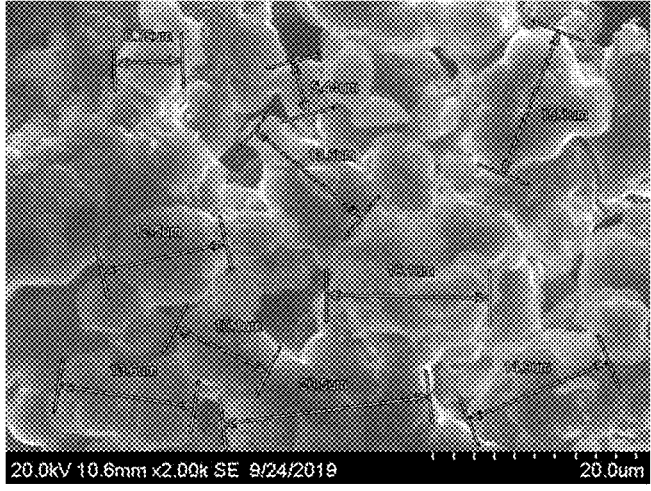
Figure 6C:
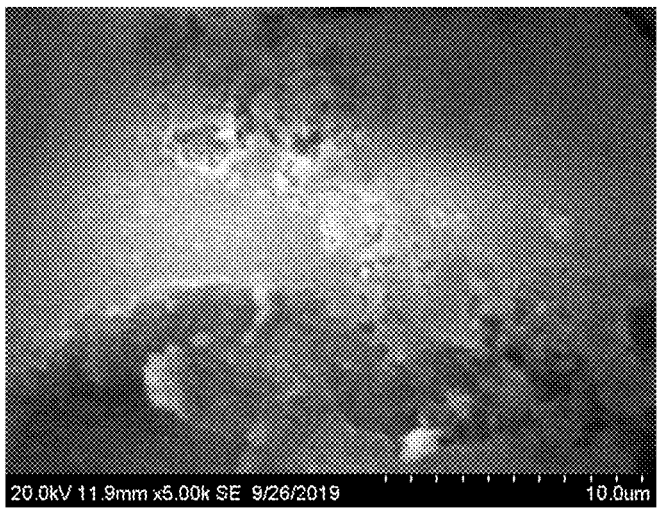
Figure 6D:
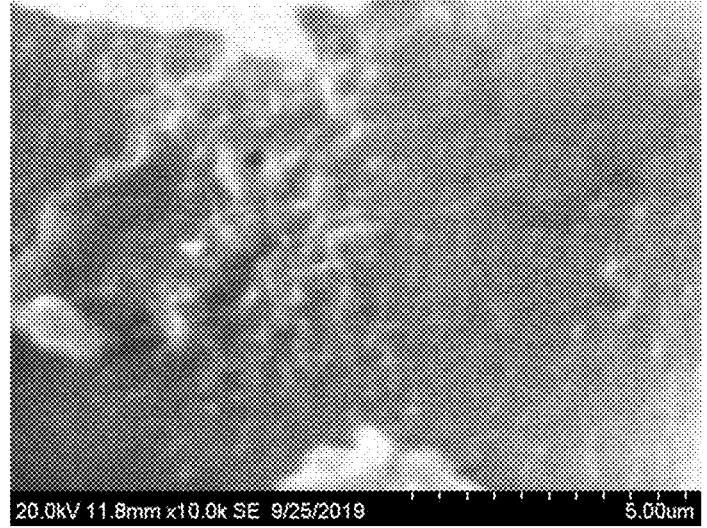

The particle size distribution varied depending on the DES used and the processing conditions. Lactic Acid DES yielded particles with a diameter from 945-4622 nm (mean of 1933 nm). Acetic acid DES produced lignin particles with a diameter anywhere from 1068-4622 nm (mean of 2126 nm). Formic acid yielded nanoscale lignin with an average particle size of less than 900 nm, where a lower incubation temperature yielded particles with a diameter between 454-740 nm (mean of 542 nm) and a higher incubation temperature yielded particles with a diameter between 454-1741 nm (mean of 819 nm). FT-IR (diamond ATR) analysis of lignin samples revealed peaks consistent with literature, as shown in FIG. 4A-B. Notably, aromatic signatures at peaks at ~1260 $cm^1$, 1160 $cm^1$, 950 $cm^1$. For comparison purposes, FT-IR analysis of Kraft lignin B and A are provided in FIG. 5A-B, respectively.

In the accompanying FIGS., wherever Sample A, B, C or D are referenced, the conditions for those samples is as follows in Table 4.

TABLE 4

| | Sample Conditions | | | |
| Sample | Average Particle Size | Molar Ratio | Temp | Time |
| --- | --- | --- | --- | --- |
| Sample A - ChCl:LA | 1939 nm | 1:6 | 120° C. | 2 hr |
| Sample B - ChCl:AA | 2126 nm | 1:6 | 120° C. | 4 hr |
| Sample C - ChCl:FA | 542 nm | 1:2 | 90° C. | 4 hr |
| Sample D - ChCl:FA | 819 nm | 1:6 | 120° C. | 4 hr |

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that when used, term "and/or", includes any and all combinations of one or more of the associated listed items, if so provided. The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

12

What is claimed is:

1. A method of extracting nanoscale lignin from lignocellulosic biomass comprising the steps of:
   mechanically disrupting the lignocellulosic biomass;
   providing a deep eutectic solvent comprising a hydrogen bond donor and hydrogen bond acceptor;
   combining the mechanically disrupted biomass with the deep eutectic solvent to form a mixture;
   incubating the mixture;
   separating the mixture into solids and liquid filtrate by filtration, additionally comprising the step of decreasing viscosity of the mixture by adding a viscosity reducer before separating the solids and liquid filtrate; wherein the viscosity reducer is an acetone and water mixture;
   precipitating lignin from the liquid filtrate, wherein the lignin has an average particle size of less than 900 nm.

2. The method of claim 1, wherein the acetone and water are in a ratio of 1:1.

3. The method of claim 1, wherein the hydrogen bond donor is a low molecular weight organic acid.

4. The method of claim 3, wherein the organic acid is selected from the group consisting of acetic acid, lactic acid, oxalic acid, formic acid, malic acid, propionic acid, maleic acid, and ascorbic acid.

5. The method of claim 4, wherein the organic acid is formic acid.

6. The method of claim 5, wherein the precipitated lignin has an average particle size of less than 550 nanometers.

7. The method of claim 5, wherein the recovered lignin has a yield of about 25 to about 100% by weight of the available lignin.

8. The method of claim 7, wherein the recovered lignin has a yield of about 80% by weight of the available lignin.

9. The method of claim 5, wherein the recovered lignin has a yield of at least 9% by weight.

10. The method of claim 1, wherein the hydrogen bond acceptor is an organic salt.

11. The method of claim 10, wherein the organic salt is choline chloride.

12. The method of claim 1, wherein the molar ratio of hydrogen bond acceptor and hydrogen bond donor is between 1:1 and 1:10.

13. The method of claim 1, wherein the deep eutectic solvent comprises choline chloride and formic acid.

14. The method of claim 1, wherein the lignocellulosic biomass is selected from the group consisting of: nut shells and husks.

15. The method of claim 14, wherein the biomass is selected from the group consisting of: peanut shells, walnut shells, almond shells, cashew shells, and coconut husks.

16. The method of claim 15, wherein the biomass comprises peanut shells.

17. The method of claim 1, wherein the step of incubating the mixture comprises subjecting the mixture to at least one of: heat, microwaves, and ultrasound.

* * * * *